(12) United States Patent
Zhao et al.

(10) Patent No.: US 8,987,966 B2
(45) Date of Patent: Mar. 24, 2015

(54) ELECTRIC MOTOR

(75) Inventors: Jian Zhao, Shenzhen (CN); Yue Li, Hong Kong (CN); Mao Xiong Jiang, Shenzhen (CN); Ya Ming Zhang, Shenzhen (CN); Xiao Ning Zhu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 403 days.

(21) Appl. No.: 13/352,590

(22) Filed: Jan. 18, 2012

(65) Prior Publication Data

US 2012/0181880 A1 Jul. 19, 2012

(30) Foreign Application Priority Data

Jan. 18, 2011 (CN) .................. 2011 1 0023334

(51) Int. Cl.
*H02K 1/27* (2006.01)
*H02K 21/12* (2006.01)
*D06F 37/30* (2006.01)

(52) U.S. Cl.
CPC .............. *H02K 1/2773* (2013.01); *D06F 37/30* (2013.01)
USPC ................... 310/156.53; 310/43; 310/156.47; 310/91

(58) Field of Classification Search
USPC ............................. 310/156.01–156.84, 43, 91
See application file for complete search history.

(56) References Cited

U.S. PATENT DOCUMENTS

| 4,977,334 | A | 12/1990 | Handler |
| 5,091,668 | A | 2/1992 | Cuenot et al. |
| 6,426,576 | B1 | 7/2002 | Varenne |
| 6,601,287 | B2* | 8/2003 | Pop, Sr. ........................ 29/596 |
| 7,332,845 | B2* | 2/2008 | Heideman et al. ...... 310/216.011 |
| 8,004,140 | B2* | 8/2011 | Alexander et al. ....... 310/156.56 |
| 2007/0247012 | A1* | 10/2007 | Shin et al. ................ 310/156.06 |
| 2008/0024018 | A1* | 1/2008 | Rignault et al. ................ 310/42 |
| 2010/0289370 | A1* | 11/2010 | Roth et al. ............... 310/156.53 |

* cited by examiner

*Primary Examiner* — Dang Le
*Assistant Examiner* — Leda Pham
(74) *Attorney, Agent, or Firm* — Muncy, Geissler, Olds & Lowe, P.C.

(57) ABSTRACT

An electric motor has a wound stator and a permanent magnet rotor. The rotor includes a shaft, a hub fixed on the shaft, a plurality of rotor core segments and magnets fixed around the hub, and a pair of covers fixed to axial ends of the rotor core segments. The hub and covers are formed on the rotor core segments by inserting molding and one of the covers has openings to allow the magnets to be inserted into spaces formed between adjacent rotor core segments such that the rotor core segments and magnets are alternately arranged in a circumferential direction of the rotor.

13 Claims, 7 Drawing Sheets

ELECTRIC MOTOR

CROSS REFERENCE TO RELATED APPLICATIONS

This non-provisional patent application claims priority under 35 U.S.C. §119(a) from Patent Application No. 201110023334.7 filed in The People's Republic of China on Jan. 18, 2011.

FIELD OF THE INVENTION

The present invention relates to electric motors and in particular to rotors of permanent magnet brushless direct current (PM BLDC) motors.

BACKGROUND OF THE INVENTION

Usually, a PM BLDC motor includes a stator and a rotor rotatable with respect to the stator. The rotor has at least one permanent magnet installed thereon. The stator comprises a stator core and windings wound on the stator core. The windings generate a magnetic field which coacts with the permanent magnets to drive the rotor to rotate relative to the stator. The rotor may be a so called surface mounted permanent magnet rotor in which the magnet(s) are mounted on the surface of the rotor core or a so called interior permanent magnet (IPM) rotor, in which the magnets are located in holes formed in the rotor core.

SUMMARY OF THE INVENTION

The present invention aims to provide a new IPM rotor for a PM BLDC motor.

Accordingly, in one aspect thereof, the present invention provides an electric motor comprising: a stator having a stator core with a plurality of teeth and windings wound on the teeth; and a rotor installed in the stator, the rotor comprising a shaft, a hub fixed on the shaft, a plurality of rotor core segments and magnets fixed around the hub, and two covers fixed to respective axial ends of the rotor core segments, wherein the hub and covers are integrally formed on the rotor core segments by an inserting molding process and one of the covers defines openings for insertion of the magnets into spaces formed between adjacent rotor core segments such that the rotor core segments and the magnets are alternately arranged in a circumferential direction of the rotor.

Preferably, the openings have a plurality of tapered ribs to guide the magnets into the spaces.

Preferably, each rotor core segment has a wedge-shaped inner end, and the hub has a plurality of wedge-shaped locking slots at an interface between the rotor core segments and the hub, the inner ends of the rotor core segments being engaged in the respective wedge-shaped locking slots to thereby position the rotor core segments in radial directions of the rotor.

Preferably, each rotor core segment has a pair of tongues projecting from opposite sides of an outer end thereof in circumferential directions of the rotor, and each magnet is sandwiched between two adjacent rotor core segments in the circumferential direction, the inner end of each magnet contacting the outer circumferential surface of the hub and the outer end of each magnet contacting two adjacent tongues of the two adjacent rotor core segments to thereby position the magnet in the radial direction.

Preferably, each rotor core segment defines a slot which is filled with non-magnetic material when the hub and covers are formed, the slot extending in an axial direction of the rotor.

Preferably, each slot has a pear-shaped cross section.

Preferably, the covers are connected together by a plurality of bridges located at an outer circumferential surface of the rotor core segments and respectively cover the spaces formed between adjacent rotor core segments.

Preferably, each rotor core segment defines an axial slot in which a locating pin is inserted, the locating pins being over molded by the covers when the covers are formed.

Preferably, the width of an air gap formed between the rotor core segments and the teeth of the stator increases from a portion corresponding to the middle of each rotor core segment toward portions corresponding to circumferential opposite ends of each rotor core segment.

Preferably, the maximum width of the air gap is from 1.1 to 1.6 times the minimum width thereof.

Preferably, the rotor has ten magnets forming magnetic poles and the stator has twelve teeth.

According to a second aspect, the present invention provides an electric motor used for washing machines, the motor comprising: a stator having a stator core with twelve teeth and twelve windings respectively wound on the teeth; and a rotor installed in the stator, the rotor comprising a shaft, a hub fixed on the shaft, ten rotor core segments and ten magnets fixed around the hub, and a pair of covers fixed at respective axial ends of the rotor core segments, wherein the rotor core segments and magnets are alternately arranged in the circumferential direction of the rotor and the magnets are made of ferrite.

Preferably, the width of an air gap formed between each rotor core segment and the teeth of the stator increases from a portion corresponding to the middle of the rotor core segment toward portions corresponding to circumferentially opposite ends of the rotor core segment.

According to a further aspect, the present invention provides an electric motor used for a clothes drying machine, the motor comprising: a stator having a stator core with twelve teeth and twelve windings respectively wound on the teeth; and a rotor installed in the stator, the rotor comprising a shaft, a hub fixed on the shaft, ten rotor core segments and ten magnets fixed around the hub, and a pair of covers fixed to respective axial ends of the rotor core segments, wherein the rotor core segments and magnets are alternately arranged in the circumferential direction of the rotor and the magnets are made of ferrite.

Preferably, the hub and covers are molded to the rotor core segments by an inserting molding process, one of the covers having ten openings to allow the magnets to be inserted into spaces formed between adjacent rotor core segments, and wherein a stop plate is fixed to the shaft and contacts said one of the covers for stopping the magnets escaping axially from the spaces.

Preferably, an air gap formed between the rotor core segments and the teeth of the stator has a constant radial width.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
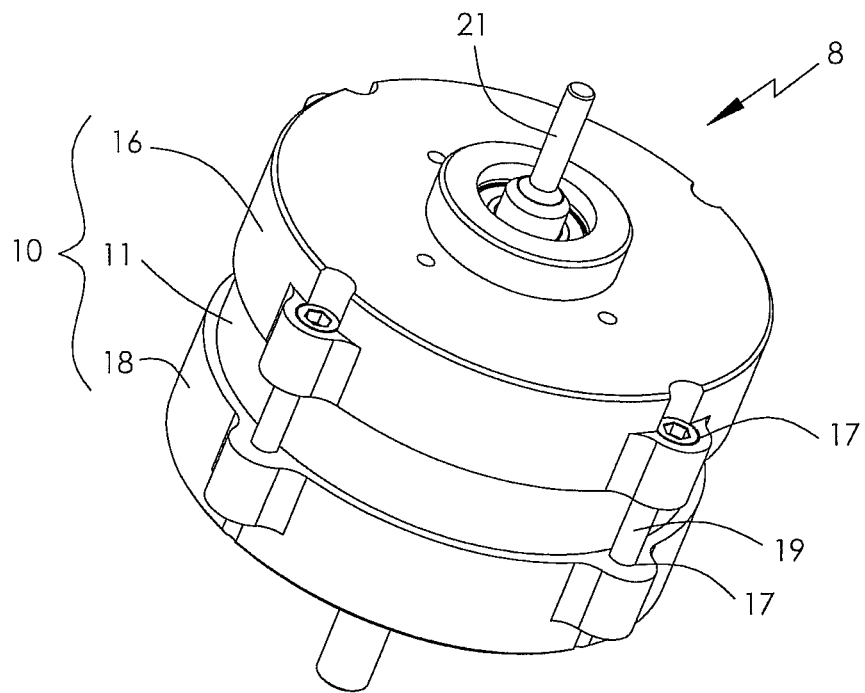
FIG. 1 illustrates an electric motor in accordance with a preferred embodiment of the present invention.
Figure 2:
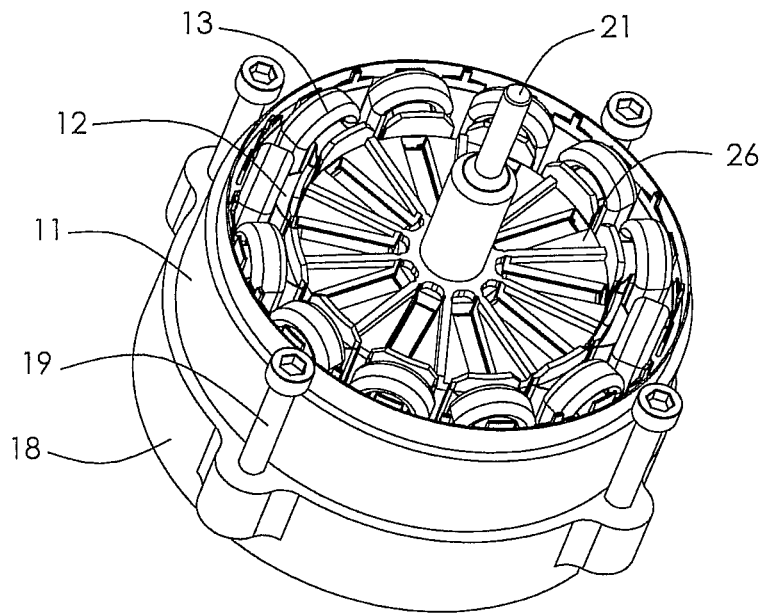
FIG. 2 illustrates the motor of FIG. 1 with one end cap removed.
Figure 3:
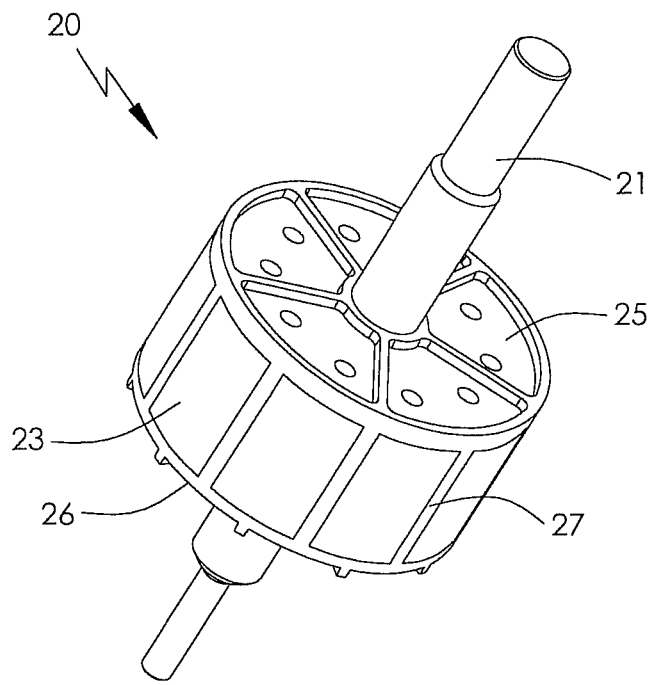
FIG. 3 illustrates a rotor of the motor of FIG. 1.
Figure 4:
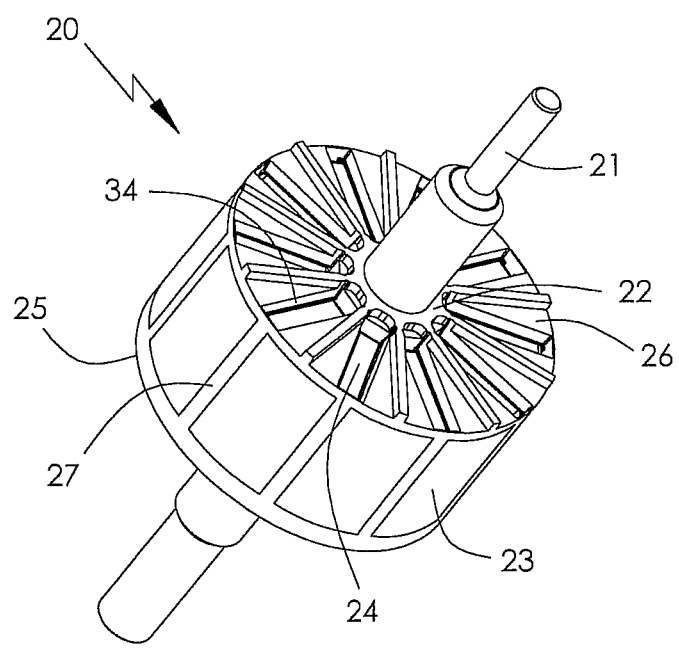
FIG. 4 illustrates the rotor of FIG. 3 from a different angle.

FIGS. 1 to 7 illustrate a brushless electric motor 8 according to a first preferred embodiment of the present invention. The motor comprises a stator 10 and a rotor 20 rotatably disposed within the stator. The stator comprises a stator core 11 with a plurality of teeth 12 extending inwardly there from, windings 13 respectively wound on the teeth 12, and two end caps 16 and 18 disposed at respective axial ends of the stator core. The end caps 16 and 18 define a plurality of pairs of coaxial holes 17 for fasteners 19 to fix the end caps 16 and 18 to the stator core 11.

Referring to FIGS. 3 to 6, the rotor 20 comprises a shaft 21, a hub 22 fixed on the shaft 21, a plurality of rotor core segments 23 and magnets 24 fixed around the hub 22, and a pair of covers 25 and 26 disposed at opposite axial ends of the rotor core segments 23 and magnets 24.

Figure 5:
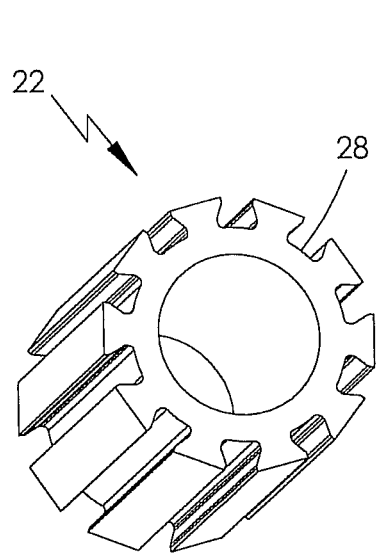
FIG. 5 illustrates a hub of the rotor of FIG. 3.
Figure 6:
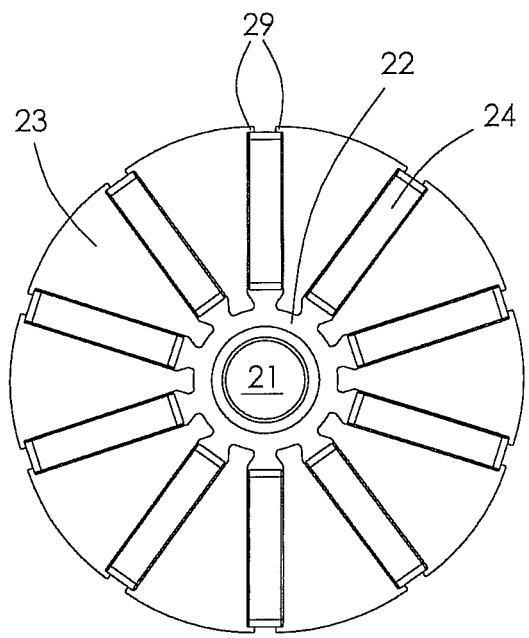
FIG. 6 is a cross sectional view of the rotor of FIG. 3.

As shown in FIGS. 5 and 6, the hub 22 has a plurality of locking slots 28 in the radially outer surface thereof. The locking slots 28 each have a wedge shape or dove tail cross section. Each rotor core segment 23 comprises an inner end and an outer end in the radial direction of the rotor. The inner end has a wedge shaped (dove tail) cross section corresponding to the wedge shaped cross section of the locking slots 28. The inner end of each rotor core segment 23 is interlocked with a respective locking slot 28 of the hub 22 to keep the rotor core segment 23 attached to the hub 22 in the radial direction of the rotor. The outer end of the rotor core segment 23 comprises a pair of tongues 29 projecting from opposite sides thereof in the circumferential direction of the rotor. The rotor core segments 23 and magnets 24 are alternately arranged in the circumferential direction of the rotor. Each magnet 24 is sandwiched between two adjacent rotor core segments 23 in the circumferential direction. The inner end of each magnet 24 contacts the outer circumferential surface of the hub 22 and the outer end thereof contacts with two adjacent tongues 29 of the two adjacent rotor core segments 23 to thereby position the magnet 24 in the radial direction. Preferably, adhesive is spread between the magnets 24 and the rotor core segments 23 to facilitate fixing the magnets 24 to the rotor core segments 23. The magnets 24 are polarized in the circumferential direction of the rotor and the directions of polarization of adjacent magnets 24 are reversed.

In order to reduce the weight of the rotor, surfaces of the covers 25 and 26 have a plurality of recesses. The covers 25 and 26 are connected together via the hub 22 at the inner side and a plurality of bridges 27 at the outer side. The bridges 27 are located at the outer circumferential surface of the rotor core segments 23 and respectively cover the outer ends of the spaces formed between adjacent rotor core segments 23. The bridges 27 contact respective tongues 29 and the outer ends of respective magnets 24.

Preferably, the hub 22 and the covers 25 and 26 are integrally formed on the rotor core segments 23 by way of an insert-molding process. Cover 26 has a plurality of openings 34 corresponding to the spaces formed between adjacent rotor core segments 23 to allow the magnets 24 to be inserted into the respective spaces.

In this embodiment of the present invention, adjacent rotor core segments 23 are separated from each other and the rotor core segments 23 are isolated from the shaft 21 by the hub 22, which reduces magnet flux leakage. Thus, in this embodiment of the present invention, magnets 24 made of ferrite, which much cheaper than NdFeB, can meet design requirement.

Figure 7:
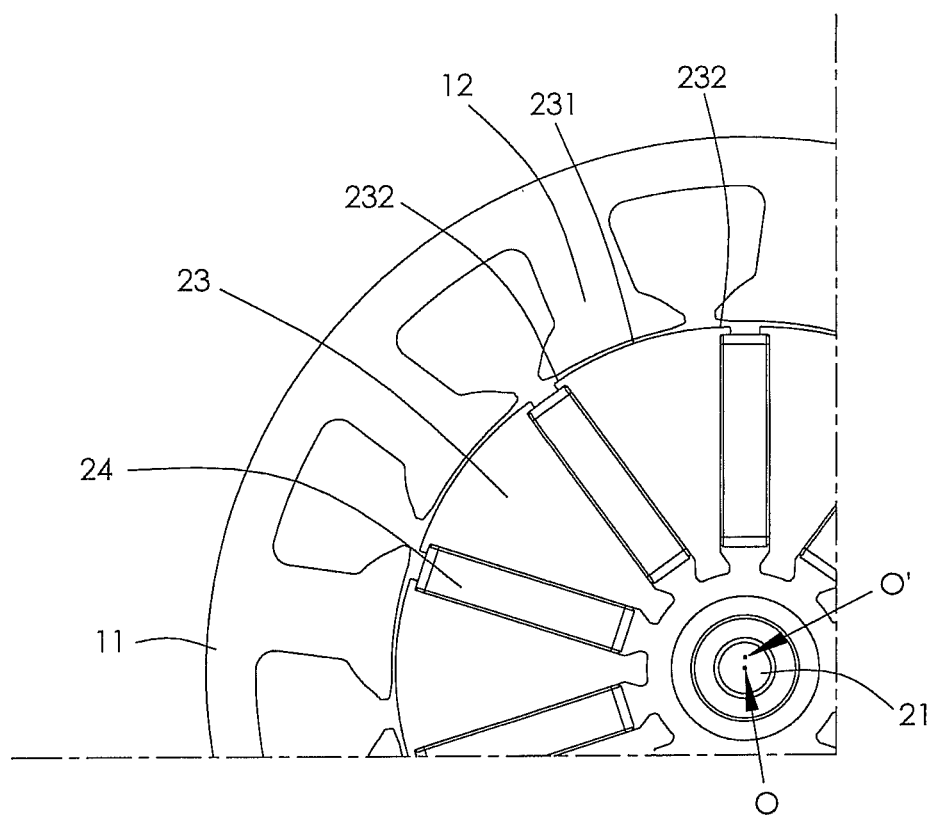
FIG. 7 illustrates a portion of an enlarged cross sectional view of the motor of FIG. 1.

Referring to FIG. 7, preferably, the air gap formed between the teeth 12 of the stator and the rotor core segments 23 is uneven. That is, the width of the air gap between the stator teeth and the rotor core segments is not constant. The radially outer surface of each rotor core segment 23 is a section of a circle having a center O' displaced from the center O of the shaft 21. The width of the air gap increases from the portion corresponding to the middle 231 of the rotor core segment 23 towards portions corresponding to the circumferential ends 232 of the rotor core segment 24. Preferably, the maximum width of the air gap is from 1.1 to 1.6 times the minimum width thereof. The uneven air gap reduces cogging torque to thereby reduce noise generated by the motor.

The method of manufacturing the rotor will now be described in detail. The method comprises the following steps.

Assemble the rotor core segments 23 into a ring around the shaft 21 using a manufacturing fixture. A central opening is formed between inner ends of the rotor core segments 23. The diameter of the opening is greater than that of the shaft 21 such that a gap is formed between the shaft and the inner ends of the rotor core segments 23. Adjacent rotor core segments 23 are spaced from each other.

The hub 22 and the covers 25 and 26 are molded to the assembled rotor core segments 23 by an insert molding process. The shaft may be fixed to the rotor core by the molding step or, alternatively, an axial hole may be formed in the hub 22 and the covers 25 and 26 for the later insertion of the shaft.

The magnets 24 are inserted into respective spaces formed between adjacent rotor core segments 24 from one axial end.

In the above embodiment of the present invention, the rotor has ten magnets forming ten magnetic poles and the stator has twelve teeth 12 with twelve slots formed between adjacent teeth 12. The motor is known as a 10-pole-12-slot motor.

Figure 8:
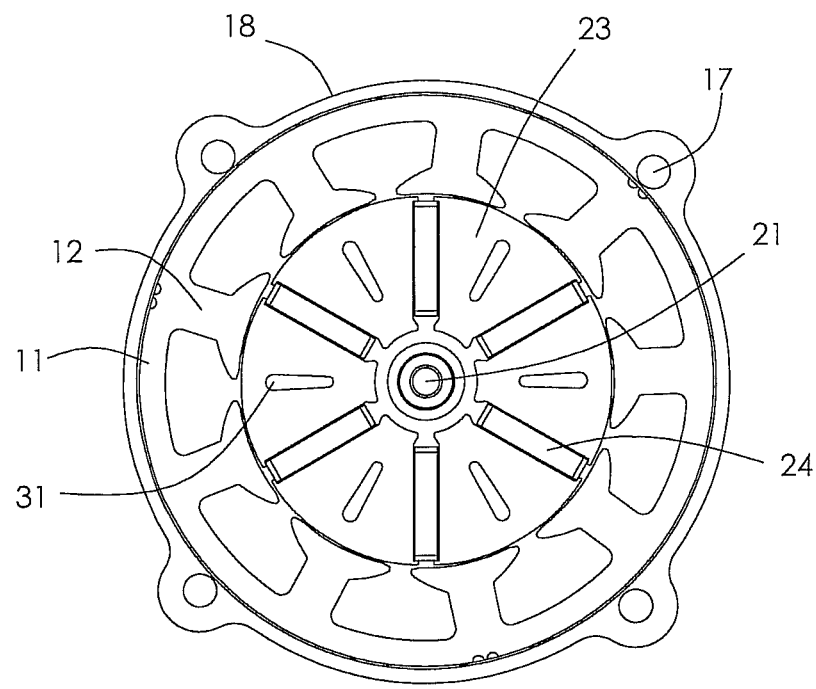
FIG. 8 is a cross sectional view of an electric motor in accordance with a second embodiment of the present invention.

FIG. 8 shows a 6-pole-9-slot motor. Preferably, in order to reduce the weight of the rotor, an axial slot 31 may be formed in the rotor core segment 23 and which is filled by the material of the covers during the step of molding the hub 22 and covers 25 and 26 to the rotor core. Alternatively, the axial slot 31 may function as a locating slot with a locating pin inserted therein when the rotor core segments 23 are assembled. The locating pins are overmolded by the covers 25 and 26 when the covers 25 and 26 are formed.

Figure 9:
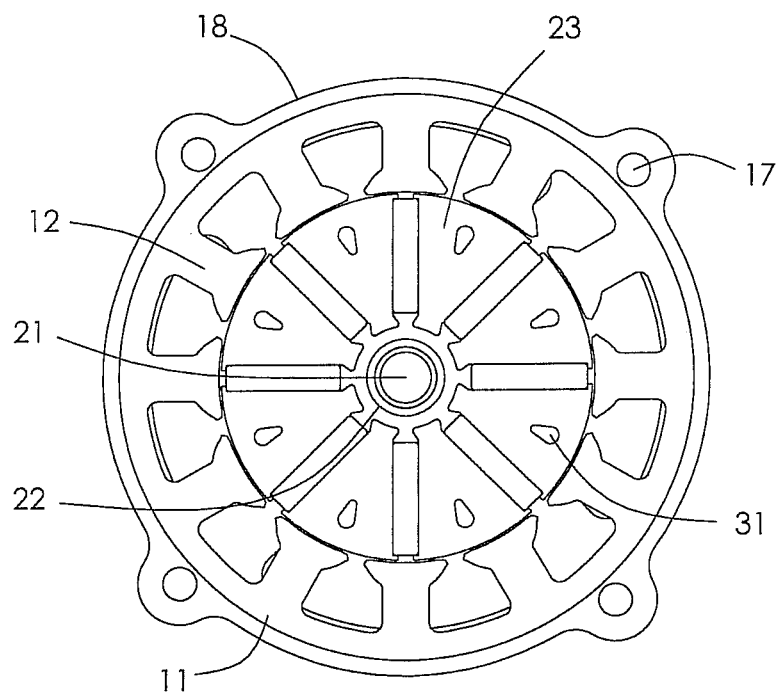
FIG. 9 is a cross sectional view of an electric motor in accordance with a third embodiment of the present invention.
Figure 10:
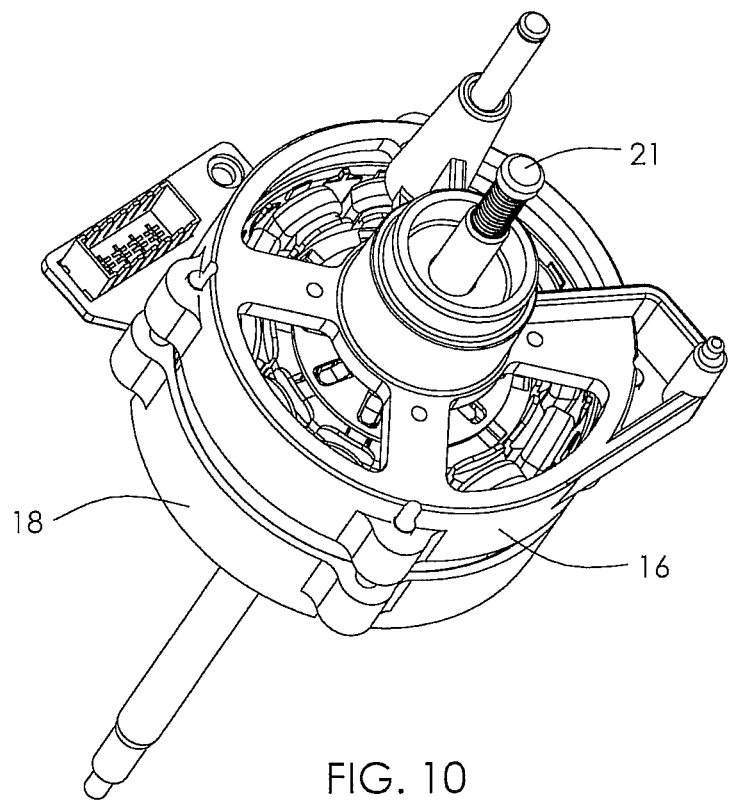
FIG. 10 illustrates an electric motor in accordance with a fourth embodiment of the present invention.
Figure 11:
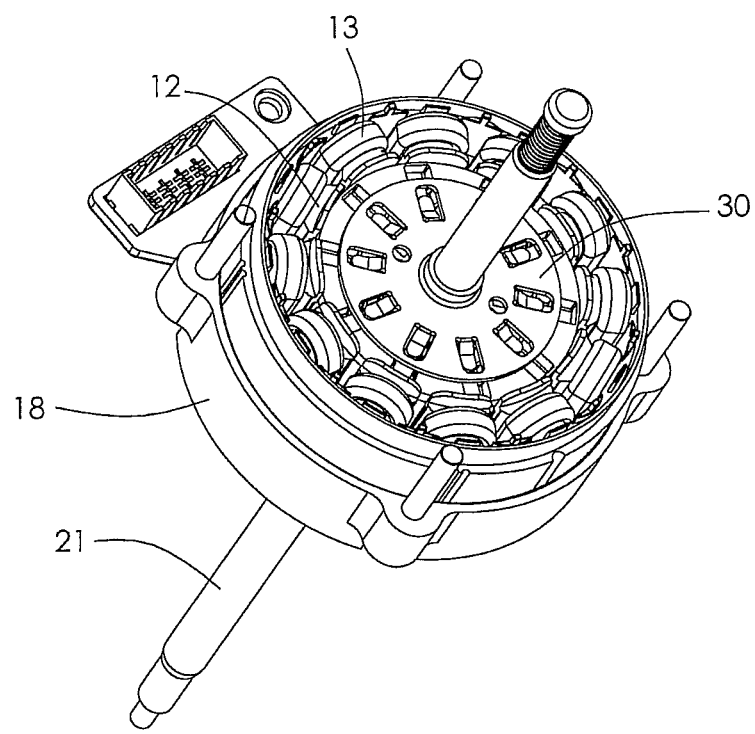
FIG. 11 illustrates the motor of FIG. 10 with one end cap removed.
Figure 12:
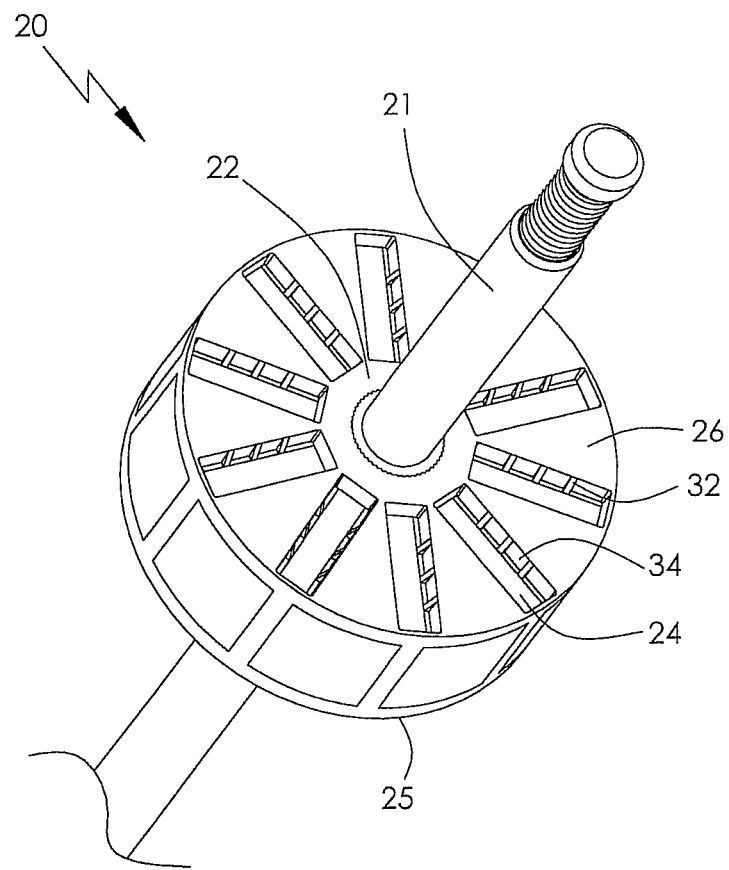
FIG. 12 illustrates a rotor of the motor of FIG. 10.
Figure 13:
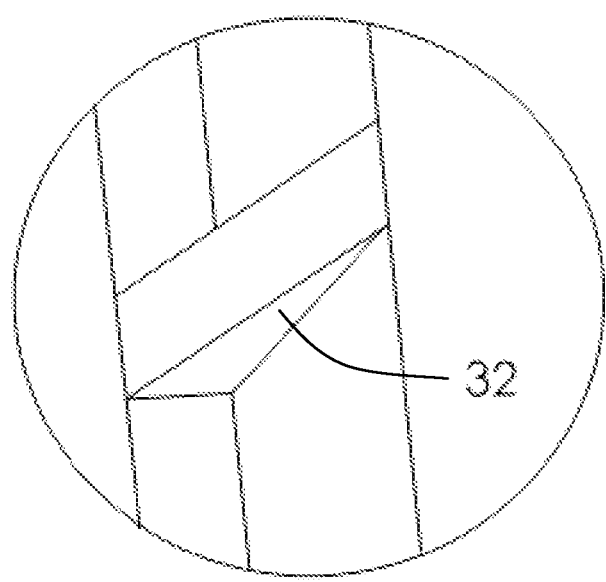
FIG. 13 illustrates a partial view of FIG. 12.

FIG. 9 shows an 8-pole-10-slot motor. Preferably, the slot 31 has a pear-shaped cross section with a small end adjacent to the hub 22 and a big end away from the hub 22. The pear-shaped slot 29 improves the magnetic flux circuit.

The motors with uneven air gap are especially suitable for washing machines.

FIGS. 10 to 13 show a similar IPM motor which is especially suitable for clothes drying machines, such as tumble dryers. In this IPM motor, the air gap formed between the teeth 12 of the stator and the rotor core segments 23 is even, i.e., the air gap has a constant width measured in the radial direction of the motor. A stop plate 30 is fixed to the shaft 21 and contacts the cover 26 for preventing the magnets 24 moving out from the space formed between adjacent rotor core segments 23 in the axial direction of the rotor, especially when the rotor is rotating at a high speed. The covers 25 and 26 have flat outer surfaces.

The openings 34 in the cover 26 may have a number of tapered ribs 32 to guide the magnets 24 into the spaces formed between adjacent rotor core segments 23, for ease of inserting the magnets. The ribs may be larger than necessary to extend slightly over the spaces with a shoulder facing the space so as to inhibit removal of the magnets once inserted, in a snap lock type of arrangement.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
   a stator having a stator core with a plurality of teeth and windings wound on the teeth; and
   a rotor installed in the stator, the rotor comprising a shaft, a hub fixed on the shaft, a plurality of rotor core segments and magnets fixed around the hub, and two covers fixed to respective axial ends of the rotor core segments,
   wherein the hub and covers are integrally formed on the rotor core segments by a single inserting molding process and one of the covers defines openings for insertion of the magnets into spaces formed between adjacent rotor core segments such that the rotor core segments and the magnets are alternately arranged in a circumferential direction of the rotor,
   wherein the openings have a plurality of tapered ribs to guide the magnets into the spaces.

2. The motor of claim 1, wherein each rotor core segment has a wedge-shaped inner end, and the hub has a plurality of wedge-shaped locking slots at an interface between the rotor core segments and the hub, the inner ends of the rotor core segments being engaged in the respective wedge-shaped locking slots to thereby position the rotor core segments in radial directions of the rotor.

3. The motor of claim 1, wherein each rotor core segment has a pair of tongues projecting from opposite sides of an outer end thereof in circumferential directions of the rotor, and each magnet is sandwiched between two adjacent rotor core segments in the circumferential direction, the inner end of each magnet contacting the outer circumferential surface of the hub and the outer end of each magnet contacting two adjacent tongues of the two adjacent rotor core segments to thereby position the magnet in the radial direction.

4. The motor of claim 1, wherein each rotor core segment defines a slot which is filled with nonmagnetic material when the hub and covers are formed, the slot extending in, an axial direction of the rotor.

5. The motor of claim 4, wherein each slot has a pear-shaped cross section.

6. The motor of claim 1, wherein the covers are connected together by a plurality of bridges located at an outer circumferential surface of the rotor core segments and respectively cover the spaces formed between adjacent rotor core segments.

7. The motor of claim 1, wherein each rotor core segment defines an axial slot in which a locating pin is inserted, the locating pins being over molded by the covers when the covers are formed.

8. The motor of claim 1, wherein the width of an air gap formed between the rotor core segments and the teeth of the stator increases from a portion corresponding to the middle of each rotor core segment toward portions corresponding to circumferential opposite ends of each rotor core segment.

9. The motor of claim 8, wherein the maximum width of the air gap is from 1.1 to 1.6 times the minimum width thereof.

10. The motor of claim 1, wherein the rotor has ten magnets forming magnetic poles and the stator has twelve teeth.

11. An electric motor, the motor comprising:
    a stator having a stator core with twelve teeth and twelve windings respectively wound on the teeth; and
    a rotor installed in the stator, the rotor comprising a shaft, a hub fixed on the shaft, ten rotor core segments and ten magnets fixed around the hub, and a pair of covers fixed at respective axial ends of the rotor core segments, one of the covers defining openings for insertion of the magnets into spaces formed between adjacent rotor core segments,
    wherein the rotor core segments and magnets are alternately arranged in the circumferential direction of the rotor and the magnets are made of ferrite, and the openings have a plurality of tapered ribs to guide the magnets into the spaces.

12. The motor of claim 11, wherein the width of an air gap formed between each rotor core segment and the teeth of the stator increases from a portion corresponding to the middle of the rotor core segment toward portions corresponding to circumferentially opposite ends of the rotor core segment.

13. The motor of claim 1, wherein the hub and two covers are one step formed piece.

\* \* \* \* \*